(12) United States Patent
Plotnik et al.

(10) Patent No.: US 8,548,998 B2
(45) Date of Patent: Oct. 1, 2013

(54) METHODS AND SYSTEMS FOR SECURING AND PROTECTING REPOSITORIES AND DIRECTORIES

(75) Inventors: Idan Plotnik, Savion (IL); Itay Podhajcer, Netanya (IL); Ohad Plotnik, Savion (IL)

(73) Assignee: Aorato Ltd., Savyon (IL)

( * ) Notice: Subject to any disclaimer, the term of this patent is extended or adjusted under 35 U.S.C. 154(b) by 0 days.

(21) Appl. No.: 13/121,191

(22) PCT Filed: Jan. 13, 2010

(86) PCT No.: PCT/IB2010/050135
§ 371 (c)(1),
(2), (4) Date: Mar. 27, 2011

(87) PCT Pub. No.: WO2010/082166
PCT Pub. Date: Jul. 22, 2010

(65) Prior Publication Data
US 2011/0258208 A1    Oct. 20, 2011

Related U.S. Application Data

(60) Provisional application No. 61/144,171, filed on Jan. 13, 2009.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC ............ 707/736; 707/754; 707/756; 709/224

(58) Field of Classification Search
None
See application file for complete search history.

(56) References Cited

U.S. PATENT DOCUMENTS

| | | | |
|---|---|---|---|
| 6,137,782 A * | 10/2000 | Sharon et al. ................. | 370/255 |
| 6,301,668 B1 * | 10/2001 | Gleichauf et al. .............. | 726/25 |
| 6,445,682 B1 * | 9/2002 | Weitz ............................ | 370/257 |
| 6,836,800 B1 * | 12/2004 | Sweet et al. ................... | 709/224 |
| 7,996,556 B2 * | 8/2011 | Raghavan et al. ............ | 709/237 |
| 8,051,106 B2 * | 11/2011 | Bird .............................. | 707/802 |
| 8,166,554 B2 * | 4/2012 | John .............................. | 726/26 |
| 2003/0212908 A1 * | 11/2003 | Piesco .......................... | 713/201 |
| 2004/0236838 A1 * | 11/2004 | Tout .............................. | 709/207 |
| 2005/0021715 A1 * | 1/2005 | Dugatkin et al. ............. | 709/223 |
| 2005/0193427 A1 * | 9/2005 | John .............................. | 726/1 |
| 2006/0101273 A1 | 5/2006 | Tan et al. | |
| 2007/0133522 A1 | 6/2007 | Morgan | |
| 2007/0282983 A1 * | 12/2007 | Gujarathi et al. ............. | 709/223 |
| 2008/0028069 A1 * | 1/2008 | Urbanek et al. .............. | 709/224 |
| 2008/0071908 A1 | 3/2008 | Nair et al. | |

* cited by examiner

*Primary Examiner* — Jay Morrison
(74) *Attorney, Agent, or Firm* — Mark M. Friedman

(57) ABSTRACT

A system and method for protecting a networked organizational data storage facility, which is accessible by a network environment, by mapping the network environment, profiling the network environment and filtering the network traffic based on said profiling of the network environment.

21 Claims, 6 Drawing Sheets

METHODS AND SYSTEMS FOR SECURING AND PROTECTING REPOSITORIES AND DIRECTORIES

This is a continuation-in-part of U.S. Provisional Patent Application No. 61/144,171, filed Jan. 13, 2009

DEFINITIONS

Repository
  A repository is a place where data or specimens are stored and maintained for future retrieval. The term 'repository', as employed within the scope of this application, is understood as referring to one or more of the following:
  A place where data is stored
  A place where specifically digital data is stored
  A place where multiple databases or files are located for distribution over a network
Directory
  In the field of software engineering, a directory is similar to a dictionary; it enables the look-up of a name and information associated with that name. In the same way that a word in a dictionary may have multiple definitions, so too in a directory, a name may be associated with multiple, different, pieces of information or types of data. The Directory is the heart of the organization and the definer of security boundaries. Herein the terms 'directory' and 'repository' will be used interchangeably and it is understood that when one term is employed if refers equally to the other.
Directory Service
  Based on this rudimentary explanation of a directory, a 'Directory Service' is the software system that stores, organizes and provides access to information in a directory. A directory service stores information about the network resources and entities across a domain, forest and also centralizes the network.
Active Directory (AD)
  Probably the most well known and commonly found directory service in use today is Active Directory™ by Microsoft™. The high level definition of Active Directory (AD) is a technology created by Microsoft that provides a variety of network services, but in the real world, Active Directory is responsible for Authentication, Authorization, Accounting, Security Policy, Identities, Entities, Naming, Replications, Security Boundaries, Trusts Relations of the organization and can include other roles that operate on the Active Directory servers. Active Directory allows administrators to assign policies, deploy software, and apply critical updates to organizations. Active Directory stores sensitive information and settings in a central database
  AD can be considered the software standard for Directories/Repositories Services due to the ubiquitous nature of the software on the global market. This being the case, the term 'Active Directory' or 'AD' is employed within the scope of this application as the generic term referring to any and all Directory/Repository Service systems fulfilling the same or substantially similar role as Active Directory™ by Microsoft™, in accordance with the definition heretofore. Even though the descriptions and explanations that follow refer particularly to Active Directory, they are to be understood to apply equally to the parallel or substantially similar functions in any and all other Directory Services.
BotMap
  A "BotMap" is a software component activated from and by the defensive system in the Analyzing phase that scans properties and configurations on remote systems on the network.
Profiling
  The term 'profiling' refers to the creation of a behavioral identity set, for a network element, based on, among other things, flows, content, best practices, structure, groups, objects, patterns, streams and scenarios. These behaviors are then translated into workflows from which filters are extrapolated.

GLOSSARY

AD—Active Directory™
CIFS—Common Internet File System
DAF—Directory Application Firewall
DCOM—Distributed Component Object Model
DDRPF—Dynamic Directory and Repository Profiling and Filtering
DLP—Data Loss Prevention
DMZ—Demilitarized Zone
DRNA—Directory and Repository Network Analyzer
DRTRC—Central Directory and Repository Threat Response and Research Center
EBM—Environment Bot Mapping
GPO—Group Policy Object
IDM—Identity Management
IP—Internet Protocol
IPS—Intrusion Prevention System
LDAP—Lightweight Directory Access Protocol
MAC—Media Access Control
NetBIOS—Network Basic Input/Output System
OSAM—Organization Security Authentication and Authorization Map
OSI-Model—Open System Interconnection Reference Model
OSKM—Organization Security Kerberos Map
OSPCP—Organization Security Post-Pro-Active Configuration Processes
RPC—Remote Procedure Call
SID—Security Identifier
SIM—Security Information Management
SMB—Server Message Block
SNMP—Simple Network Management protocol
SOC—Security Operation Center
SUID—Scenario Unique Identifier
UUID—Universally Unique Identifier

FIELD AND BACKGROUND OF THE INVENTION

The present invention relates to securing and protecting data and, more particularly, to methods and systems for securing and protecting data repositories and directories.

Owing to the central roles of the directory and directory service in any given organization, it is clear that Active Directory is the most sensitive centralized service/servers in any organization today.

In real-world scenarios, malicious hackers, internal users with malicious purpose or any other potential malicious users can connect to Active Directory and take useful information about the organization (in the Reconnaissance and Scanning phases) and use this information to perform their next phases in their attack plan. For example: hackers can create an automatic brute force attack process based on the users list from the directory.

Additional threats to the directory include: Spoofing, Tampering, Repudiation, Information Disclosure, Denial of Service, Elevation of Privileges as well as Internal Threats from legitimate users (due to the fact that every computer and each user in the network can access AD without any special permissions).

The following list summarizes a number of potential attacks on Directory Services:
- Legitimate users querying information
- Connection of illegitimate/malicious tools
- Legitimate users attempting to access the Directory from illegitimate computers or networks.
- Attacking Distributed Component Object Model (DCOM) services
- Attacking Lightweight Directory Access Protocol (LDAP Injection)
- Schema manipulation
- Data manipulation of Objects
- Remote Desktop password cracking
- Remote procedure call (RPC) attacks
- Attaching debuggers to the Directory Processes from a remote/local connection
- Dumping password hashes
- Security Identifier (SID) spoofing and manipulation
- Denial of Service
- Distributed Denial of Services
- Attacks from trusted forest on the trusting forest by a malicious entity in the trusted forest
- Attacks on shared resources in a trusting forest by malicious users in a trusted forest
- Manipulation of Directory protocols data upon transmission
- Privilege elevation

SUMMARY OF THE INVENTION

There exist in the art numerous security protocols and systems to combat such attacks. There are, though, a number of serious types of attacks against which there are currently either no defensive protocols or insufficiently effective defensive procedures and protocols. The following is a non-limiting exemplary list of attacks for which the current innovation provides the only defensive solution:
- Changing the structure of protocols in order to exploit vulnerabilities in the implementation of the protocol
- Administrator initiated attack. (Currently an administrator has total control over a system and is able to perform activities that, for example, should be approved by a separate entity)
- Legitimate requests to the directory from a source identity or computer that should not have access to said data (such as the ability to view all the information in an Active Directory domain)

It is the purpose of the present invention to provide an innovative system and method for securing Directories and Repositories. The innovation has termed Directory Application Firewall (DAF).

According to the present invention there is provided a method of protecting a networked organizational data storage facility, such as a directory or repository, from a network environment including the steps of (a) mapping the network environment using a plurality of environment analysis adapters, such as BotMaps, and (b) profiling the network environment, using a network environment profiler.

According to further features in preferred embodiments of the invention described below the mapping of the network environment includes the steps of (i) gathering raw info nation from each of a plurality of user that are capable of accessing the data storage facility via the network environment; (ii) converting the raw information into profiling information for the network environment profiler; and (iii) storing the profiling information for use by the network environment profiler.

According to still further features in the described preferred embodiments the profiling of the network environment includes the steps of: (i) profiling the entities based on profiling information from the mapping of the network environment; (ii) analyzing network traffic to the data storage facility from the entities using a network traffic analyzer; and (iii) creating a plurality of filters based on the profiling of the entities and analyzing of the network traffic from the entities, for protecting the data storage facility.

According to still further features in the described preferred embodiments, the method includes a further step of: (c) filtering the network traffic from the entities to the data storage facility using the filters.

According to still further features in the described preferred embodiments the filtering includes the steps of: processing a message of the network traffic using a protocol pack; processing at least one message stream including a plurality of messages, of the network traffic, using a stream level workflow; and processing at least one message stream scenario including a plurality of message streams, using a scenario level workflow.

According to still further features in the described preferred embodiments the protocol pack is responsible for validating the message.

According to still further features in the described preferred embodiments the stream level workflow includes steps taken from the group of (a) determining whether an individual message belongs to a new stream; (b) determining whether an individual message structure is valid; (c) determining whether an individual message location is valid; (d) determining whether an individual message has valid extensions; (e) determining whether the individual message is valid, having a valid structure, a valid location and valid extensions; and (f) determining whether the stream level workflow is to be disposed.

According to still further features in the described preferred embodiments the scenario level workflow includes steps taken from the group of (a) determining whether an individual message belongs to a new scenario; (b) passing the individual message to a stream workflow; (c) determining whether the stream workflow is valid, thereby validating the individual message; (d) determining whether the stream workflow reached a state of completion; (e) determining whether the scenario workflow has reached a state of completion; and (f) determining whether the scenario workflow is to be disposed.

According to the present invention there is provided a system for protecting a networked organizational data storage facility accessible by a network environment, comprising: (a) a plurality of environmental analysis adapters, for mapping the network environment; and (b) a network environment profiler, for profiling the network environment.

According to still further features in the described preferred embodiments the environment analysis adapters, such as BotMaps, are operative: (i) to gather raw information from each of a plurality of user that are capable of accessing the data storage facility via the network environment; (ii) to convert the raw information into profiling information for the network environment profiler; and (iii) to store the profiling information for use by the network environment profiler According to still further features in the described preferred embodiments the network profiler is operative: (i) to profile the entities based on the profiling information, from the environment analysis adapters; (ii) to analyze network traffic, from the entities to the data storage facility, using a network traffic analyzer; and (iii) to create a plurality of filters, based on the profiling of the entities, and the analyzing of the network traffic, from the entities to the data storage facility.

According to still further features in the described preferred embodiments the system further includes: (c) a message filterer, for filtering the network traffic from the entities to the data storage facility.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
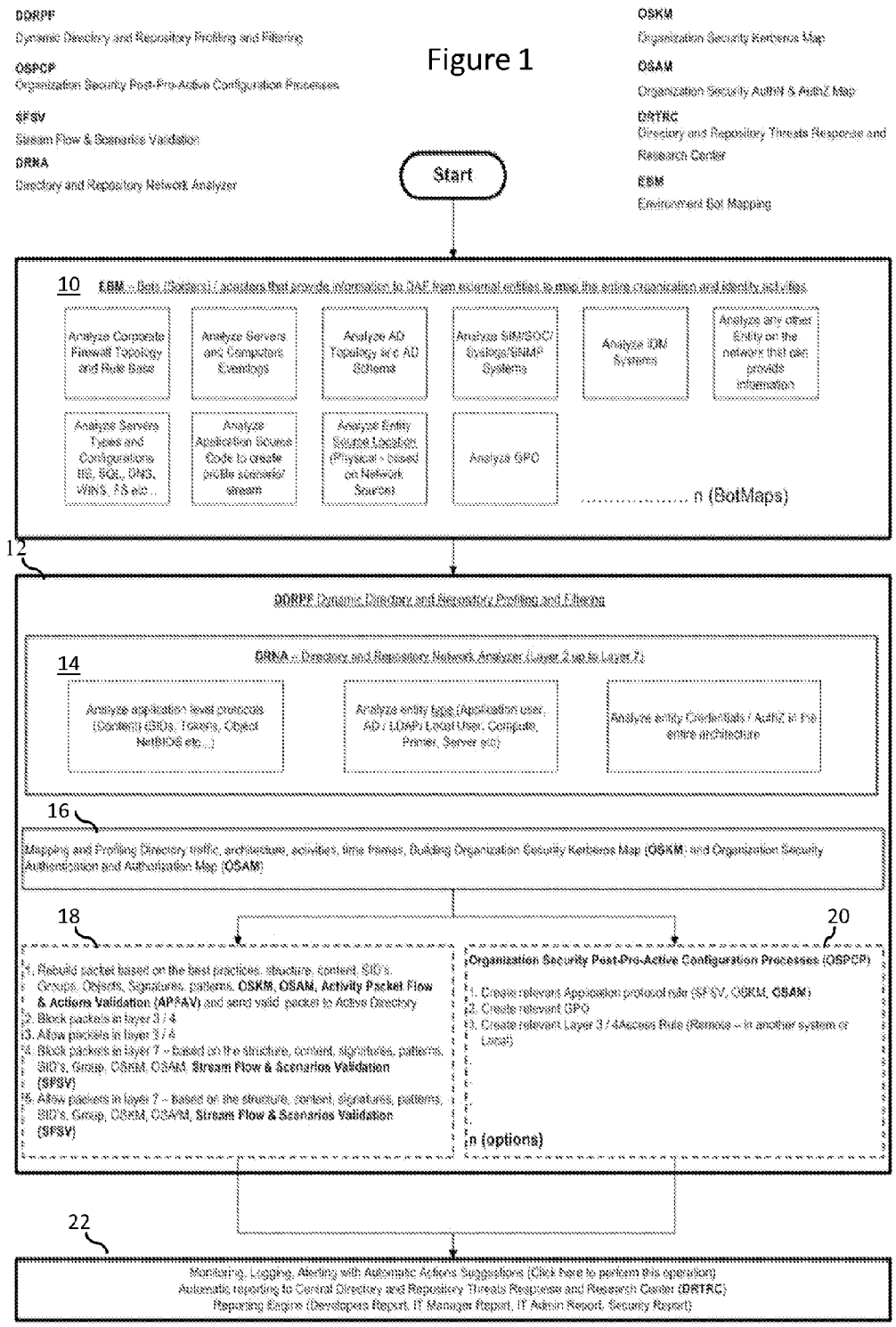
FIG. 1 is a high level flow chart of the process of an embodiment of the invention.

The principles and operation of a system and methods for securing Directories or Repositories according to the present invention may be better understood with reference to the drawings and the accompanying description.

The present invention discloses system and methods for securing and protecting directories and repositories that are located on the internal networks, external networks, intranet networks, protected networks, wireless networks, DMZ networks, and other network that require directory and repository. The security system can be implemented on the directory and repository servers locally (as a secured-zone middleware solution) or between the servers and the rest of the network to act as a Transparent Proxy (for traffic from the resources to Active Directory and back). The implementation can be on hardware- or software-based.

Conceptually, the current innovation can be divided into the following six distinct phases (although, practically, these phases are not always implemented in a distinct fashion):
1. In the first phase, Environment Bot Mapping (EBM) takes place where "BotMaps" are deployed to map the organization structure. The BotMaps connect to all software applications and technology and are to be considered as adapters for each destination technology.
2. An algorithmic analysis of the organizational interplay between users, 1.5 computers, servers and applications vis-à-vis the directory, such as, but not limited to:
   The creation of new objects (Users, Computers, etc.)
   The addition of objects to groups and the assigning of permissions thereto.
   Domain replications.
   LDAP queries.
   Authentication.
   Access to domain objects.
   Access to domain resources that direct requests to the directory (e.g. for authorization etc.).
   This analysis defines the organizational character of the specific organization.
3. Validating the structure and content of the network protocol and stream design from layer 2 through layer 7 (of the OSI-Model).
4. "Profiling the organization". The process by which the system maps scenarios (such as those mentioned in phase 2). This architecture can be based on agents on the client side which add SUIDs (Scenario Unique Identifier) to a stream based on application behavior. The DAF identifies the SUID and creates the specific profile. In a case where agents are not used, the DAF identifies specific network streams (which include a bulk of protocol sets) and determines which stream should follow the previous one, coming next in the flow, based on the first stream. The system will thereby identify the scenario, based on this behavior.
5. Connecting any profile (Phase 4) to a set of protocols (phase 3) at the highest level (for example, joining a workstation to a domain), to the organizational "character" (Phase 2) and to the organization structure (Phase 1).
6. Adding an appropriate action for every activity from the above mentioned group. Activities include but are not limited to: Allow, Block, Cleaning threats and allow, Alerts (monitor—passive mode) etc.

As mentioned before, the system will provide improved tools for IT administrators to better administer the information systems, by providing central management tools for the network. In addition, improved tools will be provided for the Information Security Administrators by providing organizational network and application layer protections as well as authentication, authorization, accounting and permission compartmentalization.

The following is an exemplary and non-limiting list of threats for which the current embodiment of the defensive system provides solutions:
1. There exist today a multitude of very sophisticated malicious code modules and viruses capable of spoofing an administrator account (or any other account with weak password), for the purpose of causing harm to a system by, for example, creating fictitious accounts with access to the central directory. The current innovation provides a solution for this type of threat.
2. The system also prevents LDAP injection, by recognizing the profile of the specific LDAP statements and queries based on scenarios.
3. Attacks originating from remote hosts (whether within the organization or outside thereof) are prevented by recognizing such activity as 'out-of-the-ordinary' activity, based on learned ability to recognize ordinary activity.
4. Exploitation of RPC, SMB, CIFS, NetBios, and the like are prevented by compartmentalization of activity within the network.
5. The system provides additional defense and protection for directories inside the network that replicate directories on the DMZ (currently, DMZ directories are compromised)
6. Preventing authorized users from initiating activities outside the scope of their work.
7. Block users logging into two workstations in the domain at the same time from different locations on the network.
8. Preventing attacks on product applications and servers that are located on the DMZ, and interacting with the directory (nowadays many products such as Web servers, Mail servers, Reverse Proxy, etc. interact with the directories for a whole host of reasons).
9. The system provides a Data Loss Prevention (DLP) solution by preventing data leakage from the directory.

The following is an exemplary and non-limiting list of solutions which the current embodiment of the system provides for both System administrators and IT professionals:
1. Central management tools for controlling more than just the permissions on the network (for example: a Kerberos map that will allow an administrator to see which identity tries to access a specific resource over the network)
2. Central application and network level monitoring tools for the entire organization architecture.
3. The "Learning mode" or Passive Mode (the Environmental Analysis Process) avoids overhead for the system administrators by creating scenarios based on behaviors learned from the network traffic, with minimal manual intervention.
4. Secure management for Directory services and unique solutions for automation and provisioning, compliance and audits, security and management.
5. Automatic group membership based on given activities. For example, an operator performing a system backup is identified by the DAF as an identity that is attempting to access the directory with a specific stream that is construed as the beginning of a backup scenario. This specific user is granting Backup rights when automatically added to the group.
6. Efficient Directory administration with simple-to-deploy solutions that enable organizations to maximize their investment in Active Directory.
7. Provide improved interfaces for administrators and the Help Desk.
8. Protect against unknown exploitation attempts, viruses, spyware and is other malicious content that try to attack the directory or make illegal use the directory services.
9. Provides assurance to security administrators and system architects that traffic to and from directories is safe.
10. Security managers will not be afraid to create trusts between AD in different sections of the system.
11. Security managers will not be afraid to open problematic protocols such as, but not limited to, LDAP, RPC, CIFC, SMB and NetBIOS between networks owing to the fact that the contents of the protocols are clearly visible.
12. Currently, security or IT administrators are unable to recognize if a remote authentication or access request is coming from a remote or local connection. With the DAF, the administrators are now able to recognize which user performed authentication or gained access to a local resource and from which computer or network they did so. Furthermore, the administrators are able to restrict, control and validate resources that accesses remotely.

Initial Analysis Stage—Mapping the Target System

Referring now to the drawings, FIG. 1 illustrates a high level flow chart of the process of an embodiment of the invention. Component 10 is a schematic depiction of the initial analysis stage. In the analyzing stage, BotMaps are deployed to "crawl" the system of the organization in order to gather information and analyze various processes in the system. Potentially, the BotMaps are introduced either at each work station, at central junctions, from the defensive system hardware which is interposed between the network and the directory or from the defensive system software running on the directory or existing firewall, allowing the BotMaps access to all the elements and components of the organization system. An exemplary and non-limiting list of processes analyzed by the BotMaps, include: Corporate firewall topology and rule base; server and computer event logs; AD topology and schema; SIM/SOC, Syslogs and SNMP systems; IDM systems; server types and configurations; application source code (in order to create profile scenario/stream); physical entity source location; Group Policy Object (GPO).

The gathered information and results of analyses are transmitted to the DAF (Directory Application Firewall) for purposes of creating a virtual map of the entire system and the activities of each of the identities on the system.

Profiling and Filtering

Component 12 is a schematic depiction of the DDRPF (Dynamic Directory and Repository Profiling and Filtering) component. After the BotMaps have mapped the system and analyzed the components of the organization (vis-à-vis the structure of the target IT systems), the DAF is initiated into the target system, either as a hardware component in front of the Directory or Repository or as software on the directory. (In an alternate embodiment, the DAF is initiated into the system in the mapping stage, and the BotMaps are sent from, and report back to, the DAF). Component 12 includes the Directory and Repository Network Analyzer (DRNA) 14 which analyses all the entities, network and application traffic to and from the directory across the entire organization. Thereafter, dynamic and on-going profiles are created, based on flows, content, best practices, structure, groups, objects, patterns, streams and scenarios which are translated into workflows and then into filters which will be employed to secure the Directory/Repository.

In addition, component 12 includes Mapping and Profiling Directory 16 which maps the traffic, architecture activities and time frames as well as being in charge of building the Organization Security Kerberos Map (OSKM) and the Organization Security Authentication and, Authorization Map (OSAM).

Implementation Stage

At this point the DAF has gathered sufficient information and knowledge of the organization in order to implement the defensive array. The DAF now goes into defensive mode (no longer merely 'learning' the target system, now defending the target system as well). Two main possible defensive responses are employed by the system: 1. A message (packet) being sent from a user to the directory is 'rebuilt' based on some or all of the elements found in the following, non-limiting, list including: best practices, structure, content, SIDs, groups, Objects, Signatures, patterns, OSKM, OSAM, Activity Packet Flow and Actions Validation. The rebuilt, valid, packet is then sent to Active Directory. This response prevents the tampering of malicious elements with valid packets by attaching destructive elements to the packets. 2. The system blocks certain packets, after deeming the packets to be invalid. When employing the Block or Allow method of defense, some packets are blocked in the lower OSI layers 3 or 4 while others are only deemed invalid or harmful at a higher layer, such as layer 7, contingent on outcome of the Stream Flow and Scenarios Validation process (discussed below).

An additional or alternative outcome to the abovementioned process exists. Based on both the initial and the ongoing analysis & profile creation processes, certain pro-active security configurations are added to the process. These additions are termed Organization Security Post-Pro-Active Configuration Processes (OSPCP) 20. OSPCPs can include, for example, the creation of relevant application protocol rules, access rules and the like. These OSPCPs are unique to the character each organization.

Monitoring and Responding

The final stage of the process is the monitoring, logging, alerting, and automatic-actions suggestions stage 22. Here the system or security administrator is made aware of potential threats to the system provided with the necessary assistance in order to protect the directory and repository. In one embodiment on the invention, this stage includes, among other things, online reporting to a Central Directory and Repository Threat Response and Research Center (DRTRC). The Center gathers information on new threats and provides assistance to administrators. Other embodiments are envisioned in place of a DRTRC such as a database, event log, external file and the like. In addition, among other things, a reporting engine provides an organization security map to the manager and administrators.

Figure 2:
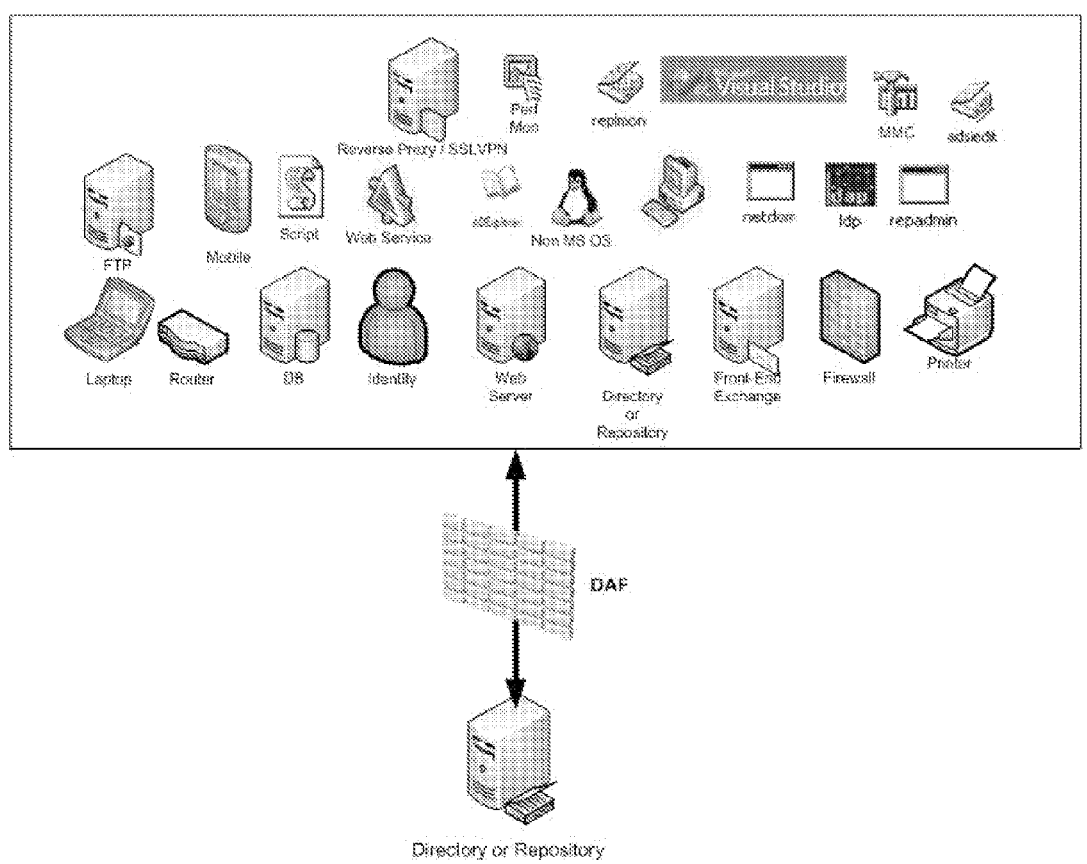
FIG. 2 is a high level conceptual network diagram, illustrating the security system and method for securing directories and repositories.

FIG. 2 depicts a high level conceptual network diagram, illustrating the security system and method for securing directories and repositories. The resources depicted in the diagram are common exemplary resources which require access to Active Directory server. The security system DAF is located between the resources and the directory.

Figure 3:
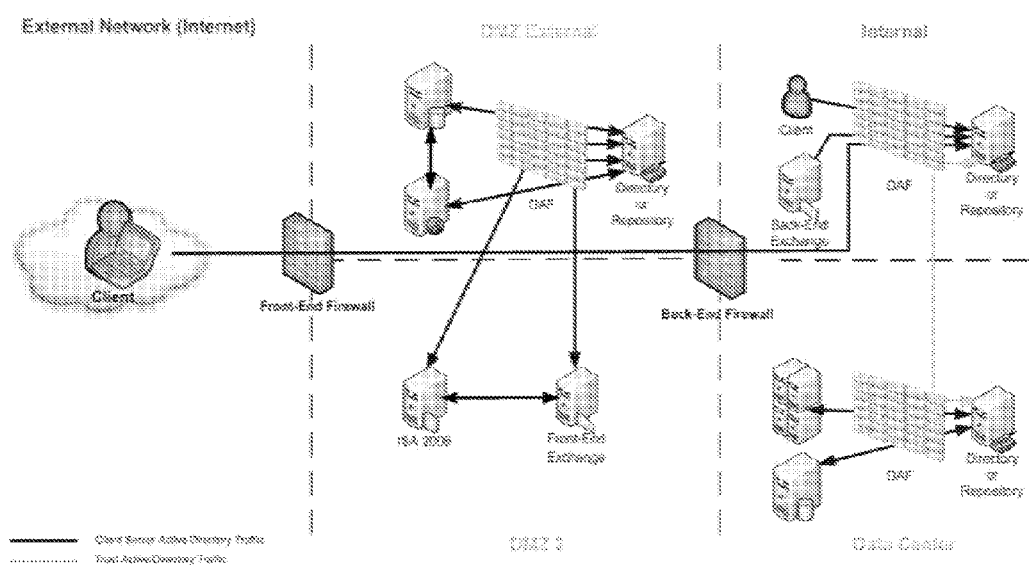
FIG. 3 is a high level conceptual network diagram, illustrating the security system as implemented in a target system including an internal segment, external DMZ, segment and an external network segment.

FIG. 3 depicts a high level conceptual network diagram, illustrating the security system as implemented in a system including an internal, intranet, segment; an external DMZ segment and an external network segment, such as, for example, the Internet. In each segment, the DAF is interposed between resources and a directory, serving as a 'gate-keeper' standing before the directory.

System Model

Figure 4:
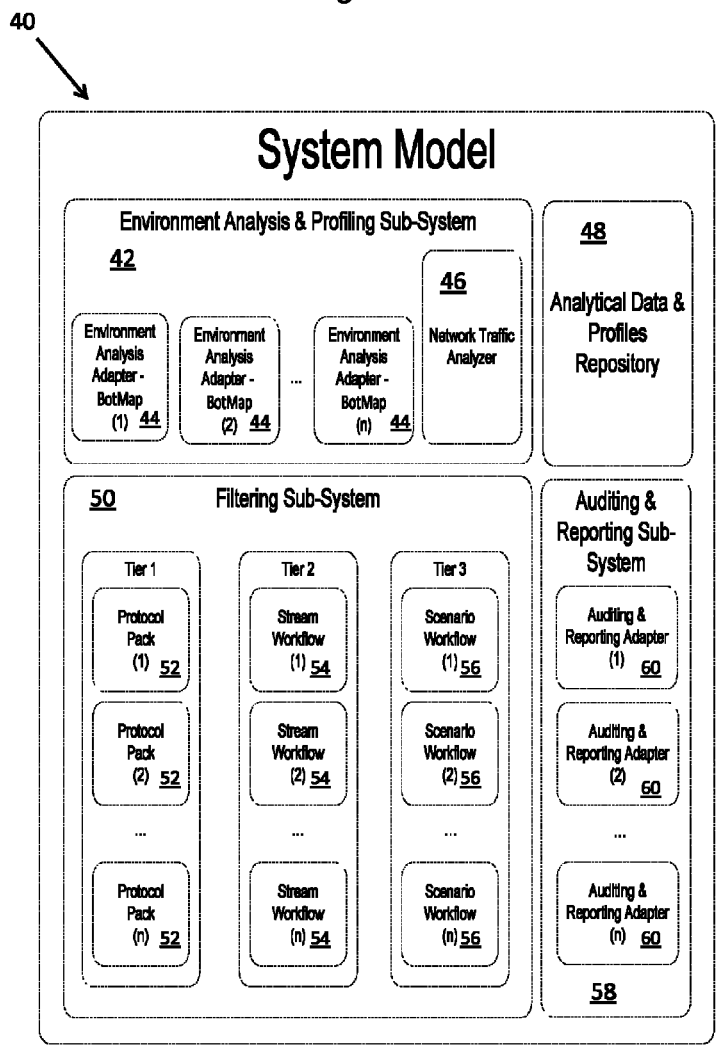
FIG. 4 is a high-level diagram of the architecture of System Model 40.

FIG. 4 is a high-level diagram of the architecture of System Model 40 which describes the some of the main components and sub-systems featured in the system, for securing and protecting repositories and directories, according to a preferred embodiment of the present invention.

Component Definitions

Environment Analysis & Profiling Sub-System

The Environment Analysis & Profiling Sub-System 42 is dedicated to executing Environment Analysis Adapters 44 and Network Traffic Analyzer 46, processing the gathered information and creating Scenario Workflows 56 that are used by the Filtering Sub-System 50 while protecting the repository.

Environment Analysis Adapter—Botmap (EBM)

The Environment Analysis Adapter component 44 gathers raw information from a predefined resource type, and converts the raw information into usable information that can be used by the Environment Analysis & Profiling Sub-System 42.

Network Traffic Analyzer

The Network Traffic Analyzer 46 is an additional analysis component that processes messages that pass through the system and extracts information that can be later used by the Environment Analysis & Profiling Sub-System 42.

Analytical Data & Profiles Repository

The Analytical Data and Profiles Repository 48 is a repository dedicated to storing all the data that is gathered by the Environment Analysis & Profiling Sub-System 42, and the profiles that are created using the gathered data.

Filtering Sub-System

The Filtering Sub-System 50 is dedicated to protecting the repository from malicious communications, from clients to the repository, by using a 3 tier model:
- Tier 1: Message processing.
- Tier 2: Stream level workflows.
- Tier 3: Scenario level workflows.

Protocol Pack

The Protocol Pack component 52 is dedicated to a protocol definition that holds all request and response message structures, a message reader (deserializer), a message writer (serializer) and message validation logic.

Stream Workflow

The Stream. Workflow component 54 is dedicated to packing numerous message structures from various protocols into one workflow to describe a stream of communication that can be performed between a client and the directory.

Scenario Workflow

The Scenario Workflow component 56 is created dynamically based on the information gathered by the Environment Analysis & Profiling Sub-System 42 and a predefined application profile. This component manages a set of numerous Stream Workflows with validation extensions, built using the gathered data, which together define a profile that is specific to the surrounding environment.

Auditing & Reporting Sub-System

The Auditing & Reporting Sub-System 58 is dedicated to distributing information and events that are created by Filtering Sub-System 50 during execution to external data stores, so that it can be reviewed and analyzed later by the relevant people in the organization.

Auditing & Reporting Adapter

The Auditing & Reporting Adapter component 60 is dedicated to transforming data delivered to the Auditing & Reporting Sub-System 58 into a format that is supported by the external data store with which this component communicates. Some examples of external data stores are: Remote Services, Databases, Event logs and text files.

Scenario Workflow Validation Process

Figure 5:
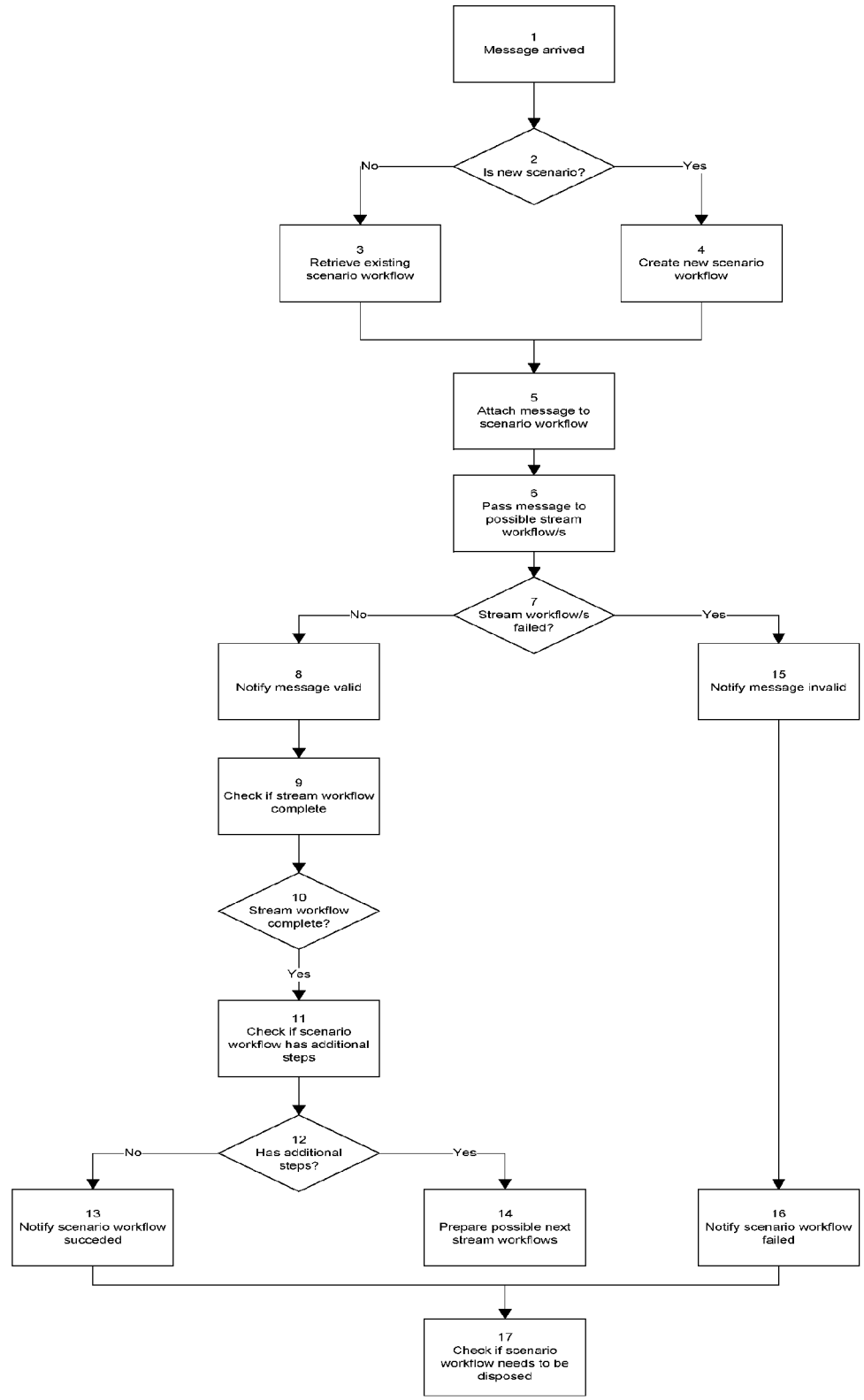
FIG. 5 is a block flow chart of the scenario workflow validation process.

FIG. 5 depicts a block flow chart of the scenario workflow validation process. According to an exemplary embodiment of the invention, the process includes the following steps:

1. A new message requiring validation enters the scenario workflow execution process.
2. The message is read in order to check if it is part of a new scenario or an already existing one. To determine whether it is a new scenario or not, an implementation might use, for example, one or a combination of the following:
   Reading multiple unique identifiers inside the message such as: Source MAC, Source IP, Timestamp, UUID, user identity, Computer identity, protocol flags.
   Use a client side agent that injects additional Scenario Unique Identifier (SUID) to the message before it is sent to the directory, which can then be read by the validation process.
3. If the message is part of an existing scenario workflow then the relevant workflow is retrieved allowing the validation process to continue.
4. If the message is part of a new scenario, a new scenario workflow is created allowing the validation process to continue.
5. The arriving message is attached to the retrieved/created scenario workflow in order for the workflow to continue the validation process.
6. The scenario workflow passes the message to one of the possible stream workflows (stream workflows are discussed later).
   It is highly possible that a scenario might have multiple stream possibilities in any given position of the workflow.
   The message might also be passed to a stream workflow that already started when previous messages arrived.

Validation extensions (discussed later), might be passed from the scenario workflow to the stream workflow instead of being attached directly to the stream workflow.
7. The result of the stream workflow is processed to determine the next course of action.
8. In the case of a stream workflow not failing, the process send notification indicating that the message was valid.
9. The process checks whether the stream workflow reached a state of completion.
10. The result of the state check is processed to determine the next course of action.
   If the stream workflow did not reach a state of completion the current scenario workflow enters an idle state until a new message arrives.
11. If the stream workflow did reach a state of completion, then the process checks whether the current scenario workflow has additional steps to perform (additional stream workflows) or has reached a state of completion.
12. The result of the state check is processed to determine the next course of action.
13. If the scenario workflow has no further steps, then the process sends notification indicating that the scenario workflow completed successfully.
14. If the scenario workflow does have further steps, then the process prepares the set of possible next steps (stream workflows) for the currently executing scenario workflow.
15. If the stream workflow did fail, then the process sends notification indicating that the message was invalid.
16. The process sends notification indicating that the scenario workflow failed.
17. The process checks whether the current scenario workflow needs to be disposed. To determine whether the scenario workflow needs to be disposed or not, an implementation may determine, for example, one or a combination of the following:
   Whether the scenario workflow has completed successfully.
   Whether the scenario workflow has failed but still needs to be kept alive for additional messages that may arrive and are associated with the current scenario workflow.
   Whether the scenario workflow has failed, but it was kept alive, and now it needs to be disposed (no additional messages will be arriving).

Stream Workflow Validation Process

Figure 6:
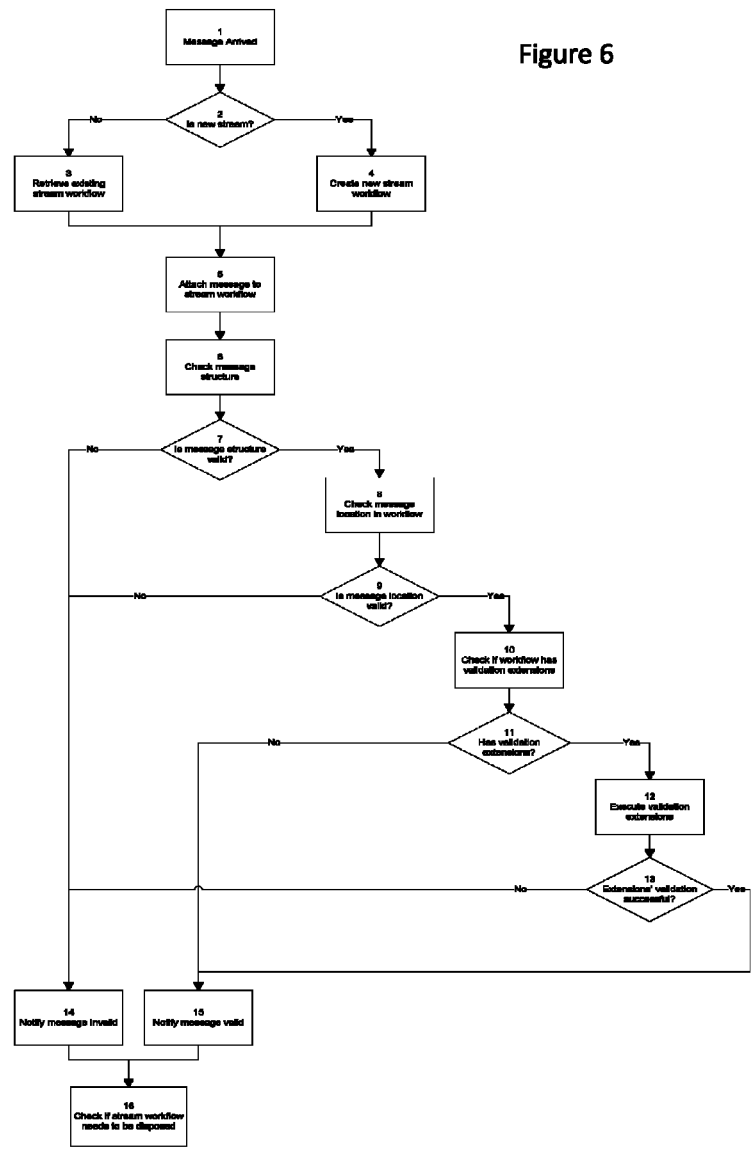
FIG. 6 is a block flow chart of the stream workflow validation process.

FIG. 6 depicts a block flow chart of the stream workflow validation process. According to an exemplary embodiment of the invention, the process includes the following steps:
1. A new message requiring validation enters the stream workflow execution process.
2. The message is read in order to check if it is part of a new stream or an already existing one. To determine whether it is a new stream or not, an implementation could use for example, one or a combination of the following:
   Reading multiple unique identifiers inside the message such as: Source MAC, Source IP, Timestamp, UUID, user identity, Computer identity, protocol flags.
   Use a client side agent that injects additional SUID to the message before it is sent to the directory, which then could be read by the validation process.
3. If the message does not belong to a new stream, then the relevant existing stream workflow is retrieved in order for the validation process to continue.
4. If the message does belong to a new stream, then a new stream workflow is created allowing the validation process to continue.
5. The arriving message is attached to the retrieved/created stream workflow allowing the workflow to continue the validation process.
6. The message structure is checked to ensure that the message matches the predetermined definition in the workflow. An implementation may check, for example, one or a combination of the following elements:
   Headers/flags included in the message.
   Length of message.
   Length of headers.
   Value of headers/flags.
   Protocol state identifiers
7. The result of the structure validation is checked to determine the course of action.
8. If the structure is valid, then the process checks whether the message that arrived was the message that was expected by the stream workflow at the current state of the workflow.
9. The result of the position state check is processed to determine the next course of action.
10. If the position state check was positive, then the process checks whether the current state of the stream workflow has validation extensions. Validation extensions may include, for example:
    Source IP address
    Source MAC address
    User identity
    Computer identity
    Source subnet
    Time frame
11. The result of the validation extensions existence check is processed to determine to next course of action.
12. If the workflow has validation extensions, then the process executes all existing validation states in the current state of the stream workflow.
13. The result of the validation extensions execution is processed to determine the next course of action.
14. The process sends notification indicating that the message was invalid.
15. If the validation extensions executed successfully, then the process sends notification indicating that the message was valid.
16. The process checks whether the current stream workflow needs to be disposed. To determine whether the stream workflow needs to be disposed or not, an implementation may determine, for example, one or a combination of the following:
    Whether the stream workflow has completed successfully.
    Whether the stream workflow has failed but it still needs to be kept alive for additional messages that may arrive and are associated with the current stream workflow.
    Whether the stream workflow has failed, but was kept alive, and now it needs to be disposed (no additional messages will be arriving).

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of protecting a networked organizational Directory Service (DS) accessible from a Directory Service network and application (DSNA) environment, comprising the steps of:
   (a) analyzing traffic to and from the DS only in order to identify actions according to order and structure of DS related protocols;
   (b) mapping the DSNA environment regarding the activities and traffic of a plurality of entities that are capable of accessing the DS via the DSNA environment, using a plurality of environmental analysis adapters; and
   (c) profiling the DSNA environment, using a DSNA environment profiler, wherein said steps encompass a Learning mode for dynamic creation of a plurality of behavioral identity sets for said plurality of entities capable of accessing the DS, said behavioral identity sets are translated into workflows from which filters are extrapolated.

2. The method of claim 1, wherein said plurality of entities includes at least one resource.

3. The method of claim 1, wherein at least one of said plurality of entities has requested access to a resource.

4. The method of claim 1 wherein said mapping of the DSNA environment includes the steps of:
   (i) gathering raw information related to DS actions usage and bidirectional traffic to and from the DS for each of said plurality of entities that are capable of accessing the DS via the DSNA environment;
   (ii) converting said raw information into profiling information for said DSNA environment profiler; and
   (iii) storing said profiling information for use by said DSNA environment profiler.

5. The method of claim 1 wherein said environmental analysis adapters include BotMaps.

6. The method of claim 4, wherein said profiling of the DSNA environment includes the steps of:
   (i) profiling said entities based on said profiling information from said mapping of the DSNA environment;
   (ii) analyzing bidirectional DSNA traffic between the DS and said entities, using a DSNA traffic analyzer; and
   (iii) creating a plurality of filters, based on said profiling of said entities and said analyzing of said network traffic from said entities, for protecting the DS.

7. The method of claim 6, further comprising the step of:
   (d) filtering said bidirectional DSNA traffic between said entities and the DS using said filters, wherein said filtering encompasses a Defensive mode.

8. The method of claim 7, wherein said filtering includes the step of processing a message of said bidirectional DSNA traffic using a DS protocol pack.

9. The method of claim 8, wherein said filtering includes the step of processing at least one message stream including a plurality of said messages, of said bidirectional DSNA traffic, using a stream level workflow.

10. The method of claim 9, wherein said filtering includes the step of processing at least one scenario including a plurality of said message streams, using a scenario level workflow.

11. The method of claim 10, wherein said DS protocol pack is responsible for validating said message.

12. The method of claim 11, wherein said stream level workflow includes steps selected from the group consisting of:
   (a) determining whether a said individual message belongs to a new stream;
   (b) determining whether a said individual message structure is valid;
   (c) determining whether a said individual message location is valid;
   (d) determining whether a said individual message has been validated by validation extensions;
   (e) determining whether said individual message is valid, having said valid structure, said valid location and said validation from said validation extensions; and
   (f) determining whether said stream level workflow is to be disposed.

13. The method of claim 12, wherein said scenario level workflow includes steps selected from the group consisting of:
   (a) determining whether a said individual message belongs to a new scenario;
   (b) passing said individual message to a said stream workflow;
   (c) determining whether said stream workflow is valid, thereby validating said individual message;
   (d) determining whether said stream workflow reached a state of completion;
   (e) determining whether said scenario workflow has reached a state of completion; and
   (f) determining whether said scenario workflow is to be disposed.

14. A system for protecting a networked organizational Directory Service (DS) accessible by a Directory Service network and application (DSNA) environment, comprising:
   (a) a plurality of environmental analysis adapters, for mapping the DSNA environment regarding the activities and traffic of a plurality of entities that are capable of accessing the DS via the DSNA environment; and
   (b) a DSNA environment profiler, for profiling the DSNA environment, wherein the system is at least partially implemented in hardware and wherein said mapping and profiling encompass a Learning mode for dynamic creation of a plurality of behavioral identity sets for said plurality of entities capable of accessing the DS, said behavioral identity sets are translated into workflows from which filters are extrapolated.

15. The system of claim 14 wherein said environment analysis adapters are operative:
   (i) to gather raw information related to DS actions, usage and traffic to and from the DS for each of a plurality of entities that are capable of accessing the DS via the DSNA environment;
   (ii) to convert said raw information into profiling information for said DSNA environment profiler; and
   (iii) to store said profiling information for use by said DSNA environment profiler.

16. The system of claim 15 wherein said environmental analysis adapters include BotMaps.

17. The system of claim 15, wherein said DSNA environment profiler is operative:
   (i) to profile said entities based on said profiling information, from said environment analysis adapters;
   (ii) to analyze DSNA traffic, between said entities and the DS, using a DSNA traffic analyzer;
   (iii) to create a plurality of filters, based on said profiling of said entities, and said analyzing of said DSNA traffic between said entities and the DS.

18. The system of claim 17, further comprising:
   (c) a message filterer, interposed between the DS and said plurality of entities, for filtering said DSNA traffic between said entities and the DS, wherein said filtering encompasses a Defensive mode.

19. The system of claim 14, wherein the system is implemented in hardware.

20. The system of claim 14, wherein said plurality of entities includes at least one resource.

21. The system of claim 14, wherein at least one of said plurality of entities has requested access to a resource.

* * * * *